No. 731,723.

Patented June 23, 1903.

UNITED STATES PATENT OFFICE.

GUSTAV TÜSCHEL, OF ODESSA, RUSSIA.

QUICK-VARNISH COMPOSITION.

SPECIFICATION forming part of Letters Patent No. 731,723, dated June 23, 1903.

Application filed November 25, 1902. Serial No. 132,783. (No specimens.)

*To all whom it may concern:*

Be it known that I, GUSTAV TÜSCHEL, manufacturer, a subject of the Czar of Russia, residing at Odessa, Russia, have invented a new and useful Improvement in Quick-Varnish Compositions; and I do hereby declare the following to be a full, clear, and exact description of the same.

The present invention has for its object an improvement in quick-varnish compositions for fine furniture.

The following recipes are sufficient to illustrate my invention:

Composition for painting pianos, billiards, and other fine furniture consisting of one hundred and forty grams of stick-lac and twenty grams of white bleached shellac, both pulverized, three grams of transparent French colophony pounded, eight grams of benzoin-gum of Sumatra, five grams of benzoin-gum of Siam, both of the latter ground, eight grams of camphors in corns pounded. These products are put into an iron kettle and are heated and mixed. When this is done, the composition rests in order to cool. Then an addition is made of twelve grams sulfuric ether and fifteen grams ground carnelian. Then this mass is thoroughly pressed and dried during three days. After these three days the mass is put into a barrel, wherein there is added one thousand grams of debased alcohol of 95° to 96°, whereupon the barrel is well closed and turned during six hours. Then the barrel is rested three days, after which time the obtained liquid is filtered and racked off into bottles. When painting with this composition, white raw wood becomes like real mahogany, and it has the advantage that the furniture that was polished with it can be washed with water without losing its brilliancy and that it does not swell in damp rooms.

Second. Black ebony varnish. The proceedings are as follows: The operation is the same as under No. 1; but when the addition of sulfuric ether is made there is added twenty grams black anilin instead of fifteen grams ground carnelian. It is used for painting raw white-wood furniture, to which it gives the appearance of real ebony.

Third. Natural brown quick-varnish is produced as follows: its fabrication being the same as in No. 1, but without any addition of an ingredient when mixing the composition with sulfuric ether. It is used for painting raw white-wood furniture and giving it the look of natural-wood furniture.

Fourth. Varnish for pianos, billiards, and other fine furniture produced as follows, the operation being all the same as in No. 1, although there is heated and mixed one hundred and twenty grams ground stick-lac, one hundred grams ground sandal-lac, twelve grams French colophony, eight grams pounded camphor, forty-five grams French white resin, (galipot,) ten grams benzoin-gum of Siam, thirty grams ground gum-mastic, twenty grams carnelian. Further, instead of one thousand grams alcohol there is added only six hundred. Then the barrel is turned during an hour, whereupon the liquid is resting six days instead of three days.

Fifth. Varnish for pianos, billiards, and other fine furniture of palisander consisting of one hundred and twenty grams sandarac, one hundred grams ground stick-lac, thirty grams ground gum-mastic, forty-five grams Venetian turpentine, twenty grams pounded white bleached shellac, twenty grams carnelian, six grams black anilin. Further, there is added twelve grams of ether and afterward six hundred grams of debased alcohol.

I claim—

1. A varnish composition containing pulverized stick-lac, pulverized white bleached shellac, French colophony, ground benzoin-gum of Sumatra, ground benzoin-gum of Siam, camphor in kernels, sulfuric ether, and debased alcohol, substantially as described.

2. A varnish composition containing pulverized stick-lac, pulverized white bleached shellac, French colophony, ground benzoin-gum of Sumatra, ground benzoin-gum of Siam, camphor in kernels, sulfuric ether, ground carnelian, and debased alcohol, 95° to 96°, substantially as described.

3. A varnish composition containing one hundred and forty grams of pulverized stick-lac, twenty grams of pulverized white bleached shellac, three grams of French colophony, eight grams of ground benzoin-gum of Sumatra, five grams ground benzoin-gum of Siam, eight grams of camphor in kernels, twelve grams of sulfuric ether, fifteen grams of ground carnelian, and one thousand grams of debased alcohol, 90° to 96°, substantially as described.

In testimony whereof I have signed this specification in the presence of two subscribing witnesses.

GUSTAV TÜSCHEL.

Witnesses:
H. D. JAMESON,
JACOB KAHN.